March 26, 1929.  O. SCHAFFLER  1,706,987

ELECTRIC WIRE INSULATOR

Filed July 18, 1927

INVENTOR.
Oscar Schaffler
BY
Myron J. Dikeman
ATTORNEY.

Patented Mar. 26, 1929.

1,706,987

UNITED STATES PATENT OFFICE.

OSCAR SCHAFFLER, OF DETROIT, MICHIGAN.

ELECTRIC-WIRE INSULATOR.

Application filed July 18, 1927. Serial No. 206,488.

The object of my invention is to produce an electric wire insulator adapted for installation in building walls for the purpose of insulating electric wires from the building wall material.

Another object is to produce an electric wire insulator suitable for installation within building walls, of a design that will prevent water from passing therethrough to which the insulator may be subjected when exposed to the weather.

A still further object is to produce an electric wire insulator for installation within building walls, which will prevent any water or moisture following the wire through the insulator and which may be used both as a splicing insulator and a bushing insulator.

A still further object is to produce an insulating section for electric wires that is equally as well adapted for use with outside wiring equipment, which will prevent water from entering or passing therethrough.

A further object is to produce an insulator for electric wires of small diameter section, with passages so designed and arranged as to produce a double strength wall, resulting in an insulator with an increased resisting capacity.

Another object is to produce an insulator that is simple in construction, can be easily and efficiently installed within a building wall and can be manufactured at very low cost.

These several objects are attained in the preferred form by the construction and arrangement of parts more fully hereinafter shown.

Similar parts on all drawings are marked by similar numerals.

Figure 2:
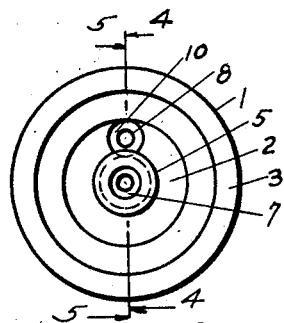
Fig. 2 is an end view of the insulator shown in Fig. 1, showing the arrangement of the ports and wire channels.
Figure 1:
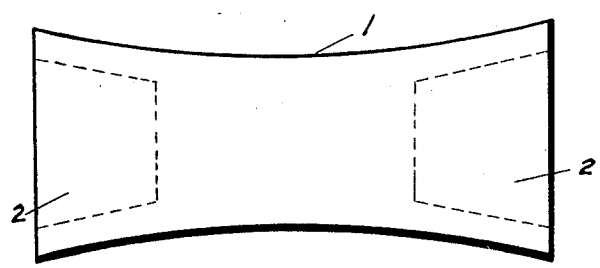
Fig. 1 shows a side view of the insulator, showing the exterior wall construction.

My device is especially adapted for wall installation in radio work, for entering antenna and ground wires, if both wires should lead from the outside or exterior of the building, or for splicing insulators as are used in electrical work where wholly exposed to the weather, or especially in installations that are arranged in horizontal positions.

I will now describe more fully my device, referring to the drawings and the marks thereon.

Figure 4:
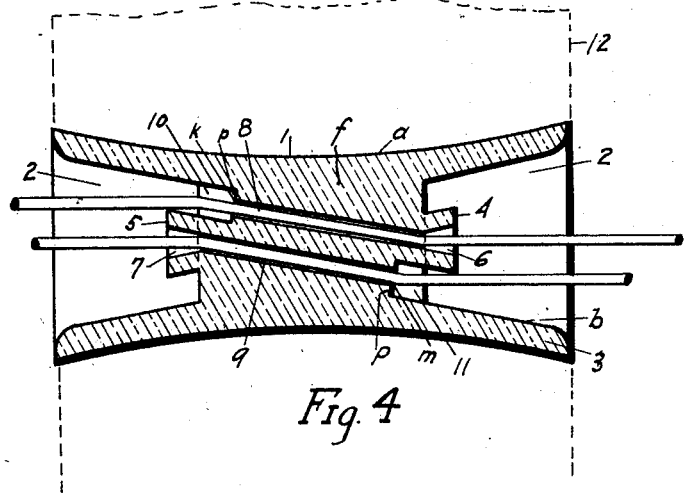
Fig. 4 is a cross-sectional view taken on line 4—4 of Fig. 2, showing the interior construction and arrangement of the wire channels.
Figure 3:
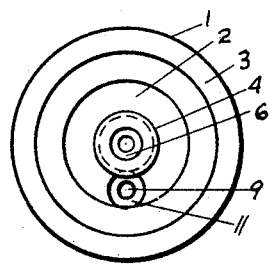
Fig. 3 is a view of the opposite end of the insulator shown in Fig. 1, also showing the positions of the inverted ports on that end.
Figure 5:
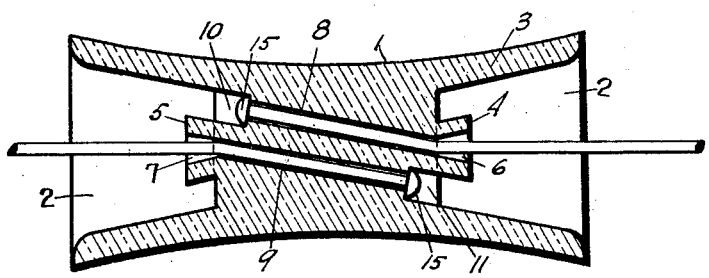
Fig. 5 is also a sectional view taken on line 5—5 of Fig. 2, illustrating the device as used for a splicing insulator.

The insulator shell —1— is preferably made of porcelain, although it might be made of any suitable insulating material, such as, hard rubber, fiber, bakelite, etc. The shell —1— is made of semi-cylindrical design and preferably with the outer walls concave, forming a smaller sectional diameter at the center of the insulator, leaving the outer walls —a— curved structure for preventing water or dampness entering the insulator. Within each end of the insulator shell —1— are formed conical recesses —2—, which extend to about one-third the length of the insulator shell, leaving a solid center section —f—. The conical walls —b— are sloped to provide shell walls —3— of a sufficient thickness to provide strength as may be required for protecting the insulator. At the bottom of the conical recesses —2— are formed inverted conical bosses —4— and —5—, the walls of which are approximately parallel with the inner conical recess walls. The bosses project only a short distance above the base. The bosses —4— and —5— are provided with conical openings —6— and —7— formed therein concentric with the axis of the bosses and the insulator. Through the center solid section —f— of the insulator shell —1— are formed two channels —8— and —9—, extending through the entire length of center section, connecting both of the end recesses —2— and forming a passageway therein. Both channels —8— and —9— are positioned at an angle with the horizontal axis of the shell —1—. Channel —8— has one end thereof connected with the conical opening —6— in the boss —4— and opposite end —k— of the channel opens directly into the recess —2— at the opposite end of the shell, but is positioned above the boss —5—. The channel —9— has one end connected with the conical recess —7— within the boss —5— and the opposite end —m— of the channel opens into the recess —2— at the opposite end of the shell, but below the boss —4—. Both channels —8— and —9— provide communicating passages between the conical recesses —2—, and the angular position in which they are set prevents water or moisture from passing therethrough in one direction. At the ends —k— and —m— of the channels —8— and —9— are formed extended cylindrical recesses —10— and —11—, each of which are provided with a rectangular shouldered end wall —p—, forming a shouldered recess at the channel ends. When my device is used as a wall insulator it is placed within the building wall —12— in approximately the same position as shown in Fig. 4 with the right hand end of the insulator as shown in the figure placed on the outside wall in such a manner that the recess —11— will be positioned below the center boss —4— and both channels —8— and —9— positioned to slope upward as they recede from the outer building wall. The conical recesses —2— act as storm protectors for insulated wires and prevent much of the storm from direct contact with the channels leading through the building walls. The inverted conical boss —4— placed at the bottom of the recess —2— would intercept most of the water that would reach the bottom of the recess and discharge it along the walls of the insulator preventing most of it from coming in contact with the wire itself. The conical recess opening within the boss —4— through which the wire passes is positioned to discharge any water or moisture that might come directly in contact with the wire at that point and discharge the water therefrom back into the recess —2— which would prevent any water passing through the insulator channel —8—. The opening in the channel —9— which is positioned directly beneath the boss —4— is fully protected and the sloping walls will discharge any moisture entering therein back to the outside of the walls. When the insulator is used as a conduit where a complete circuit is desired, both wires are passed through the channels —8— and —9— and are continuous as illustrated in Fig. 4. The shell completely insulates one wire from the other. If the insulator is to be used for splicing wires connected directly with an electric circuit where insulation therefrom is necessary, each wire may terminate in one of the recesses —10— and —11— and are provided with end collars —15— for securely attaching the wires within the insulator. Each wire leaves the insulator through the center conical bosses —4— and —5— which exert the stress on the insulator directly at the center thereof. All stress is exerted on the insulator in compression. The angular position of the channels —8— and —9— provides means for attaching the wires, fully insulating one from the other, and produces added resistance within the shell itself as each wire passes therefrom at the center line of the shell. The curved outer walls —a— of the insulator are designed more especially for out-door installation, where the entire insulator is exposed to the weather, and any rain falling on the insulator is drawn toward the center and discharged from the bottom edges of the rim and not allowed to pass over the end recess channels —2—, preventing the running of water within the insulator, except for the water that might enter by falling in the recesses themselves, which is immediately discharged by the conical walls.

For interior installations within building walls, the shell may be made either a true cylindrical outer formation or even with convex wall structure, depending upon the position at which it is to be used. The convex outer wall structure is more suitable for exterior wall installation, while the cylindrical structure is a more convenient form for interior installation.

Having fully described my insulator what I claim as my invention and desire to secure by Letters Patent is:

1. An electric wire insulator adapted for installation within a building wall for insulating electric wires therefrom, comprising an elongated shell casing made of suitable insulating material, said casing having a conical recess formed in each end thereof, substantially parallel open channels formed through the body of the shell opening into each of the said end conical recesses, said channels being positioned within the body at an angle with the axis of the shell.

2. An electric wire insulator adapted for installation within a building wall for insulating wires therefrom, comprising an elongated shell having a conical recess formed in each end thereof, substantially parallel passage channels formed through the body lengthwise thereof and opening into the end conical recesses, each of said channels being positioned at an angle with the axis of the shell, and inverted conical bosses formed at the ends of the channel openings and projecting into the end shell conical recess.

3. An electric wire insulator adapted for installation within a building wall, comprising an elongated casing shell, the outer walls of which are curved, said shell having a conical recess formed in each end thereof, substantially parallel passage channels being formed through the body of the shell and connecting the end conical recesses, all said passage channels being positioned therein at an angle with the axis of the casing shell, one end of each channel being provided with an inverted conical boss which projects within the end conical recesses of the casing in a manner for protecting the electric wires that may be passed through the channel, and for preventing the passing of water through the insulator.

4. An electric wire insulator adapted for installation within the wall of a building for insulating electric wires therefrom, comprising an elongated casing shell, having a conical recess formed in each end thereof, two passage channels formed through the shell connecting both of the end conical recesses, said passage channels being positioned parallel with each other and at an angle with the axis of the casing shell, each passage channel having one end opening into the conical end recess, concentric with the axis of the insulator, such concentric openings being provided with inverted conical bosses, and the opposite ends of said channels opening into the opposite end conical recesses at opposite sides of the axis, and being provided with socket recesses at the channel ends.

In witness whereof, I sign these specifications.

OSCAR SCHAFFLER.